Dec. 10, 1940. J. J. RING ET AL 2,224,638
PRIME MOVER CONTROL SYSTEM
Filed April 1, 1938
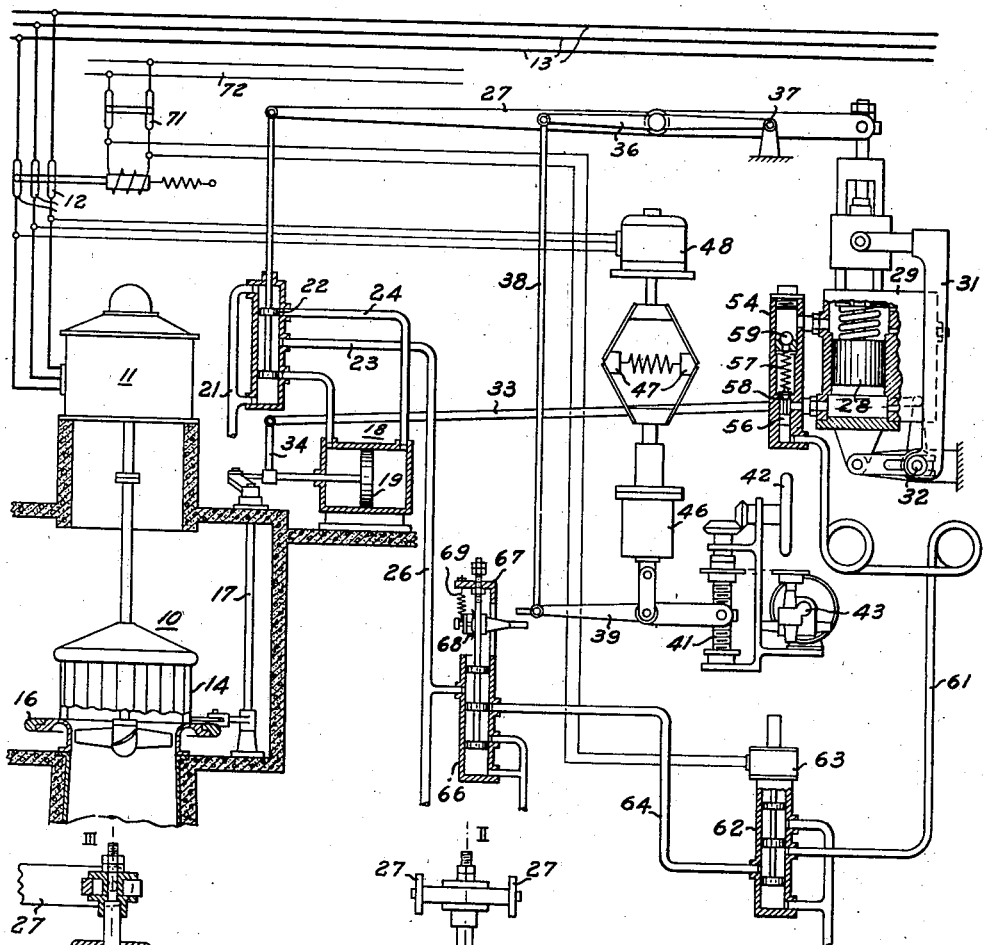
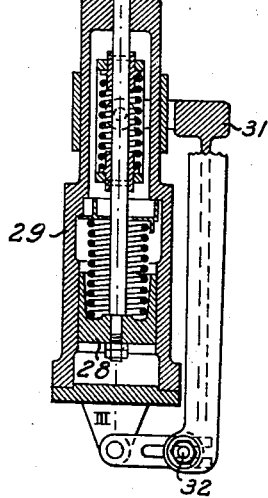
Fig. 2
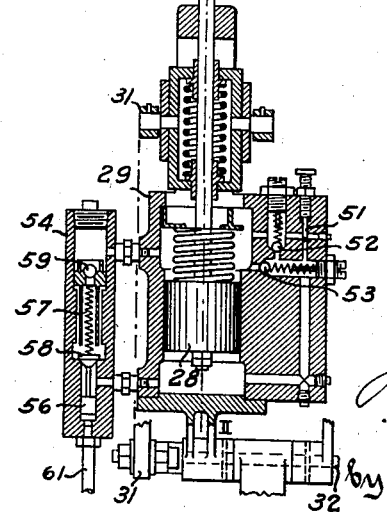
Fig. 3
Fig. 1
Inventors
J. J. Ring
W. J. Rheingans
B. R. Nichols
by
Attorney Patented Dec. 10, 1940

2,224,638

UNITED STATES PATENT OFFICE 2,224,638

PRIME MOVER CONTROL SYSTEM

Joseph J. Ring, William J. Rheingans, and Beverly R. Nichols, Wauwatosa, Wis., assignors to Allis-Chalmers Manufacturing Company, Milwaukee, Wis., a corporation of Delaware Application April 1, 1938, Serial No. 199,412

5 Claims. (Cl. 121—42)

This invention relates in general to improvements in control systems for prime movers and more particularly to control systems wherein a plurality of different prime mover generating units supply electric current to a common distribution line and particularly to systems in which one unit alone is employed to regulate load variations of the distribution line.

In the production of electric energy by a combination of different prime mover generating units, such as a steam turbine or other fluid driven unit and a hydroelectric unit, it has been found that, if each unit is controlled independently by its own governor to deliver a certain but variable load, danger of "hunting" between the several units and a substantial reduction of the overall efficiency of the system is invited rather than eliminated. To avoid such danger, energy translating devices of similar operating characteristics, such as steam turbine generating units, have heretofore been chosen to deliver a predetermined constant load to the distribution line whereas hydroelectric units have been employed to provide the variable load operation necessary to secure the frequency regulation of the entire distribution system. Because both types of energy translating devices operate at their best efficiencies at about 85% of their maximum capacities, it is more economical to use one unit only and preferably a hydraulic unit, due to the fact that it operates at maximum efficiency over a wide load range without requiring adjustment of its operating conditions, for maintaining the proper frequency of the distribution line.

Inasmuch as the speed governor of the hydroelectric unit is preferably of the type disclosed and claimed in Patent 2,106,684, J. J. Ring, B. R. Nichols and A. Pfau, January 25, 1938, which is highly sensitive and produces comparatively large flyball movements for small speed changes, the restoring or compensating mechanism thereof will return the pilot valve controlling the gate operating servomotor to neutral or mid-position before the gate vanes have moved an appreciable amount. The occurrence of an overload on the distribution line therefore requires a considerable number of governor movements and hence a considerable time interval to restore the system frequency to its predetermined value which time lag is normally not permissible. The governor system as disclosed herein is therefore arranged for normal functioning of the restoring leverage with its dashpot upon the occurrence of small load changes but opens a bypass valve at the restoring dashpot upon the occurrence of predetermined overloads which results in a speed and hence a frequency drop. Such bypass valve action results in a momentary elimination of the normal dashpot relaying action and the pilot valve is held open until the gates open to a position which corresponds with the load demand or are fully open. As soon as the normal speed and frequency of the distribution line is reestablished, the bypass valve of the restoring leverage dashpot automatically closes and the restoring leverage again functions in the usual manner.

It is therefore an object of this invention to provide a control system for prime mover generating units supplying electric energy to a distribution line to which a plurality of units contribute a constant load and a single unit is responsive only to load variations on the line.

Another object of this invention is to provide a control system for prime mover generator units supplying a distribution line, some of the units being adjusted to provide a constant output at their most efficient operating condition and deriving their energy from one source of power and at least one other unit deriving its energy from a different source and alone, within the capacity of the unit, controlling both the normal and excessive load variations within a minimum time interval.

Another object of the invention is to provide means for eliminating the action of a control system restoring leverage to permit an uninterrupted movement of a driving fluid control means for one of a plurality of prime mover generating units suplying a distribution line, upon the occurrence of overloads on the line.

Objects and advantages other than those above set forth will be apparent from the following description when read in connection with the accompanying drawing, in which:

Fig. 1 is a diagrammatic illustration of one embodiment of the invention shown as applied to a hydraulic turbine operating an electric generator and in which the various portions of the control system are shown in a diagrammatic form to facilitate understanding thereof;

Fig. 2 represents a vertical cross section taken on the line II—II of Fig. 3 to illustrate the construction and connection of the dashpot in the restoring leverage of the system; and Fig. 3 is a vertical cross section taken on the line III—III of Fig. 2 to show the construction and relation of a bypass valve for the dashpot of the control system restoring leverage.

Although several steam turbine driven generators and hydroelectric units supply electric current to the distribution line, it will be understood that only one hydroelectric unit is intended to be employed for regulating load variations in the line. The illustration therefore includes only the single unit employed for such regulation and the control apparatus which may be necessary to accomplish the desired results.

Referring more specifically to the drawing by characters of reference, the improved governor control system is herein shown as applied to prime movers such as the hydraulic turbine 10 of the propeller type driving an alternating current generator 11 connected through a circuit breaker 12 with a distribution line 13. The turbine is shown herein as being set in an open flume from which the flow of fluid pressure to the turbine is controlled by an annular series of movable gate and guide vanes 14 adapted to be moved into different positions by a shifting ring 16. The shifting ring is actuated by a suitable linkage mechanism connection with a vertical shaft 17 which is rotated by a fluid pressure operated servomotor 18. Fluid under pressure is supplied to the opposite sides of the servomotor piston 19 from a suitable source (not shown) by way of a supply pipe 26 under the control of a pilot valve 22 and through pipes 23 or 24. The pilot valve 22 also controls discharge of fluid pressure from the servomotor by way of pipes 23 and 24 and a discharge pipe 21. The stem of the pilot valve 22 is connected with one end of a lever 27, the other end of which is connected with the piston 28 of a dashpot generally indicated at 29. The dashpot piston 28 is also movably connected by a link 31 with a spindle 32, the movable connection having been described in detail in the above identified patent. The spindle 32 is connected by an arm, a rod 33 and a second arm 34 with the piston rod 19 of the servomotor 18. All of the above mechanism mechanically connecting the pilot valve 22 and the servomotor piston 19 compensates the action of the pilot valve by restoring such valve to its neutral or midposition upon movement of the servomotor to actuate the turbine gate and such mechanism is accordingly herein collectively termed the restoring leverage. The lever 27 is pivotally connected intermediate its end with a lever 36 having one of its ends pivotally movable about a fixed point 37. The other end of lever 36 is pivotally connected with a rod 38 which is in turn pivotally connected adjacent one end of a lever 39 having the other end thereof movably connected with a screw 41 which may be rotated manually by means of wheel 42 or which may be operated by a motor drive 43 which may, of course, be remotely controlled. The screw 41 and its operating means together form means for starting or adjusting the entire control system and are well known as a so-called "synchronizer."

The lever 39 is connected intermediate its ends with a speed governor which comprises a servomotor 46 connected intermediate the ends of lever 39. The servomotor 46 is controlled by a substantially balanced valve arranged therein and operated by the movement of a centrifugal flyball set 47. The flyballs are of relatively small size and are mounted entirely on springs to avoid friction in such flyball set wherever possible. The flyballs are driven by an electric motor 48 connected with the generator 11 and therefore responsive to any load variations thereon. The entire above governor mechanism is described in detail in the above identified patent and such description is accordingly not repeated herein.

The dashpot 29 is provided with a needle valve 51 (see Fig. 3) by which the rate of flow of fluid between the chambers on opposite sides of the dashpot piston 28 can be controlled for normal speed operation of the dashpot. Delayed movement of the dashpot piston 28 is permitted by ball valves 52 and 53 which may open dependent on the direction of flow of fluid required. Adjustment of the needle valve 51 is sufficient to secure proper control of the system so long as the load changes thereon are relatively small. When large load changes occur, the above mentioned needle and ball valves controlling the passages are unable to pass a sufficient quantity of oil to allow for correction of the load change before the restoring leverage returns the pilot valve to the neutral position thereof. The governor system above described would therefore have to operate repeatedly and would correct a large load change only by a large number of small increments which would require too great an interval of time to be permissible under present conditions.

The present invention therefore provides for a bypass valve for the dashpot 29 which valve is capable of bypassing control fluid in such quantities that the dashpot action is momentarily eliminated or reduced to a minimum which results in a long continuous movement of the servomotor piston 19 and the gate 14 operated thereby. As soon as the normal line conditions are attained, the dashpot bypass closes. The bypass valve may be made integral with the body portion of the dashpot 29 or may be attached thereto as shown herein and comprises a casing 54 containing a piston 56 normally held in closed position by a spring 57 and with a check valve 58 formed integral with the piston. It is to be noted that the bypass is so proportioned that the control fluid passes readily from the compression chamber of the dashpot to the relief chamber thereof through a ball check valve 59 provided the check valve 58 is in the open position. The portion of the bypass casing 54 below the piston 56 is connected by a tube 61 with a valve 62 operable by a solenoid 63. The valve 62 is normally biased to closed position and is opened only when the generator 11 is connected with the distribution line to energize the solenoid. The solenoid valve 62 is connected by a tube 64 with a valve 66 which is connected with the pressure supply pipe 26. The stem of the valve 66 is guided by an upward extension 67 from the casing thereof and is provided with nuts engaging with such extension to form means for limiting the stroke of the valve. The valve 66 is operated by a friction slip connection 68 engaging the stem thereof and is connected by a spring 69 with the extension 67 which spring aids in retaining the valve normally in the open position. The slip connection 68 extends into the path of movement of governor lever 39 and is engaged thereby upon movement of such lever beyond its normal range due to the occurrence of a large load variation.

Assuming that the entire generating system is composed of units operated by fluids having different characteristics, such as steam turbine driven generator units and a hydroelectric unit, to which combination the present invention is particularly applicable, it will be difficult to provide a constant distribution line frequency if the governor of each unit shares in the regulation for maintaining the line frequency. Such arrangement would produce hunting between the various units and would lower the overall efficiency of the system. The steam turbine driven generators are therefore operated at governor settings which produce a constant output at their best efficiency, whereas the hydroelectric unit with its supersensitive governor assumes the regulation for maintaining the frequency of the entire distribution line at a predetermined value.

The entire sequence of control system operations will be more readily understood if the operation of the system is considered from the starting point, that is starting from standstill rather than from the running position in which it is shown in the drawing. The generator 11 is at that time disconnected from the main line 13 and the circuit breaker 12 must be closed by closure of hand switch 71 to energize the closing mechanism for the circuit breaker 12 from an auxiliary or power house circuit 72. The valve 62 will be in the closed position preventing control fluid from opening the valve 58 of the bypass valve 54—59 due to deenergization of the solenoid 63 as long as the switch 71 is open. The bypass valve 54—59 is inoperative during starting and the relay dashpot 29 therefore functions normally.

The prime mover is started by rotation of the synchronizer spindle 41 either manually or by the electric motor drive 43 to raise the end of the lever 39 which in turn causes the left hand end of the lever 36 to move in a downward direction, thus depressing the floating lever 27 and opening the pilot valve 22 for the passage of fluid pressure to the left hand side of the servomotor piston 19 which forces the turbine gate 14 to open. It will be understood that, under normal conditions of starting, the finger end of the lever 39 engages the friction slip connection 68, but the valve 62 will be closed and therefore fluid pressure acting through the pipe 64 will be stopped by the closed valve 62. Assuming now that the unit is in synchronism with other units supplying the distribution line, the switch 71 is closed, thus closing the circuit breaker 12 and energizing the circuit of the solenoid 63 to open the valve 62. The unit is now in full operation and is controlled solely by the flyball governor 46—48.

The governor 46—48 being of a type producing relatively large flyball movements for small speed changes, and because the piston of the pilot valve 22 follows the gate movement almost instantly, it will be obvious that frequency changes of greater than normal magnitude could not be corrected by the governor within a reasonable period of time unless the action of the dashpot 29 is temporarily reduced to a minimum to permit the servomotor piston 19 and the gate 14 to move continuously for a predetermined length of time. The dashpot 29 has therefore been provided with the bypass valve 54—59 actuated, upon the occurrence of a frequency drop of greater than normal magnitude, by the movement of the lever 39 in a downward direction beyond its predetermined normal limits until it depresses the friction slip connection 68 and opens the valve 66. Fluid pressure is then permitted to flow through the pipe 64, the solenoid valve 62 and the tube 61 and lifts the check valves 58 and 59 into the open position. The dashpot fluid under compression is allowed to pass freely from the compression chamber to the upper or relief chamber and the delaying action of the dashpot is eliminated until the governor motor 48 responds to the resultant rise in frequency in the line 13. The higher speed of the governor 46—48 then raises the lever 39 and the upwardly biased slip connection 68 is released, thus causing the valves 66, 58 and 59 to close in succession to reestablish normal operation of the dashpot 29.

From the above description it will be readily apparent that a prime mover operated by fluid, in the present instance by water under pressure, is controlled by a gate controlling the flow of such fluid. The gate itself is operated by means including a servomotor shown as being fluid pressure operated and which servomotor is controlled by means shown as being a valve designated as a pilot valve. Means responsive to the speed of the prime mover are provided to control the gate operating means, that is the servomotor and the pilot valve, and such speed responsive means are indicated as being an electric motor driven flyball set acting on the pilot valve through a suitable governor servomotor and a suitable leverage. Means are provided for compensating the gate servomotor movement and comprise a suitable leverage containing a time delay dashpot by which leverage the pilot valve and hence the gate servomotor are restored to neutral or midposition. And finally, means are provided for neutralizing the restoring effect of the leverage on the pilot valve and the gate servomotor, which means provide a pressure operated valve freely passing fluid from one chamber of the dashpot to the other chamber thereof upon the operation of such valve by fluid pressure jointly controlled by a solenoid valve and a governor operated valve, the solenoid valve being immediately opened upon energization of the prime mover and the governor operated valve acting only when the prime mover speed drops below predetermined limits. The friction slip connection between the governor and the valve operated thereby is necessary to allow biasing of such valve to return it to its closing position, thus again placing the entire system in condition for the control of further loads beyond the range of loads normally controlled by the governing system.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a system for governing a machine operable at variable speeds, means for controlling the flow of operating fluid to the machine, means responsive to the speed of the machine for controlling said fluid flow control means, a leverage and a dashpot connecting said flow control means with said speed responsive means for restoring the same to the neutral position after operation thereof, a fluid pressure operated valve for bypassing fluid around the piston of said dashpot for neutralizing the effect thereof, and a plurality of valves operated severally dependent on different operating conditions of the machine for controlling the operation of said pressure operated valve.

2. In a system for governing a machine operable at variable speeds, means for controlling the flow of operating fluid to the machine, means responsive to the speed of the machine for controlling said fluid flow control means, a leverage and a dashpot connecting said flow control means with said speed responsive means for restoring the same to the neutral position after operation thereof, a fluid pressure operated valve for bypassing fluid around the piston of said dashpot for neutralizing the effect thereof, a valve actuated upon starting the machine, and a valve operated by said speed responsive means upon occurrence of predetermined speed decrease, both said machine actuated valve and said speed responsive actuated valve cooperating to control operation of said bypass valve.

3. In a system for governing a machine operable at variable speeds, means for controlling the flow of operating fluid to the machine, means responsive to the speed of the machine for controlling said fluid flow control means, a leverage and a dashpot connecting said flow control means with said speed responsive means for restoring the same to the neutral position after operation thereof, a fluid pressure operated valve for bypassing fluid around the piston of said dashpot for neutralizing the effect thereof, a plurality of valves operated dependent on different operating conditions of the machine for controlling operation of said fluid pressure operated valve, and means yieldingly connecting one of said plurality of valves with said speed responsive means for operation thereby in one direction.

4. In a system for governing a machine operable at variable speeds, means for controlling the flow of operating fluid to the machine, means responsive to the speed of the machine for controlling said fluid flow control means, a leverage and a dashpot connecting said flow control means with said speed responsive means for restoring the same to the neutral position after operation thereof, a fluid pressure operated valve for bypassing fluid around the piston of said dashpot for neutralizing the effect thereof, a plurality of valves operated severally dependent on different operating conditions of the machine, all of said plurality of valves cooperating to control operation of said bypass valve, a friction slip connection for securing operation of one of said plurality of valves by said speed responsive means, and means for returning said speed actuated valve to the neutral position after release by said speed responsive means.

5. In a system for governing a machine operable at variable speeds, means for controlling the flow of operating fluid to the machine, means responsive to the speed of the machine for controlling said fluid flow control means, a leverage and a dashpot connecting said flow control means with said speed responsive means for restoring the same to the neutral position after operation thereof, a fluid pressure operated valve for bypassing fluid around the piston of said dashpot for neutralizing the effect thereof, a plurality of valves operated severally dependent on different operating conditions of the machine, all of said plurality of valves cooperating to control operation of said bypass valve, a friction slip connection for securing operation of one of said plurality of valves by said speed responsive means, and a spring connecting the stem of said speed actuated valve with the casing thereof to close said valve after release by said speed responsive means.

JOSEPH J. RING.
WILLIAM J. RHEINGANS.
BEVERLY R. NICHOLS.